Oct. 5, 1965     H. J. DIETZSCH ETAL     3,209,622
PROCESS FOR THE MANUFACTURE OF MULTIPLE-HOLE SPINNING BODIES
Original Filed March 8, 1956     4 Sheets-Sheet 1
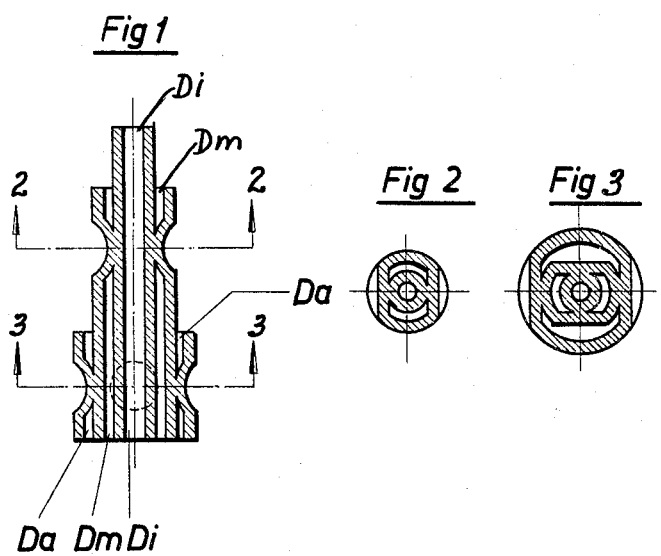
Inventors
Hans J. Dietzsch
Otto Dietzsch Oct. 5, 1965   H. J. DIETZSCH ETAL   3,209,622
PROCESS FOR THE MANUFACTURE OF MULTIPLE-HOLE SPINNING BODIES
Original Filed March 8, 1956   4 Sheets-Sheet 2
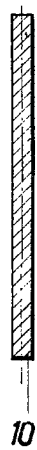
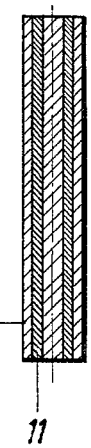
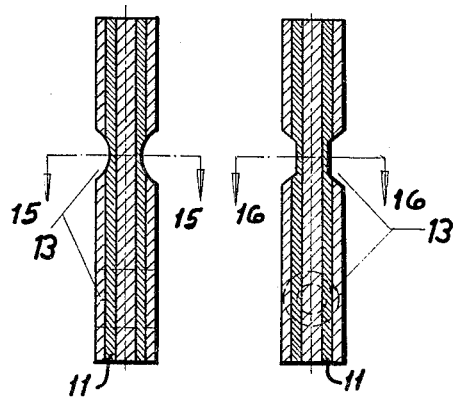
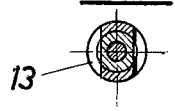
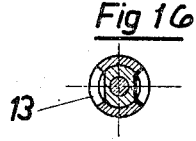
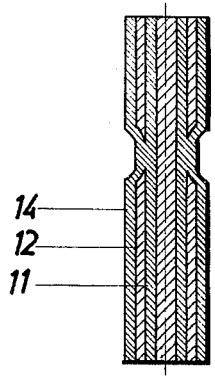
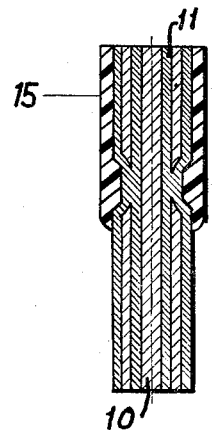
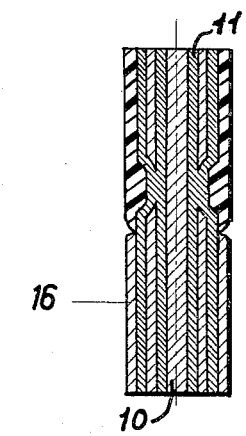
Inventors
Hans J. Dietzsch
Otto Dietzsch
By Watson, Cole, Grindle & Watson
Attys.

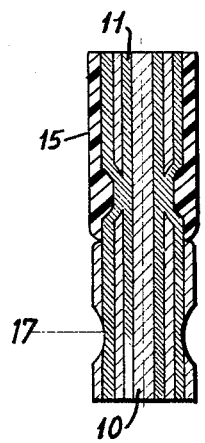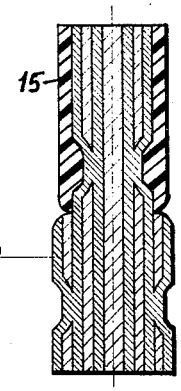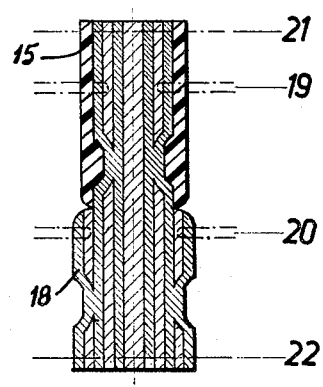

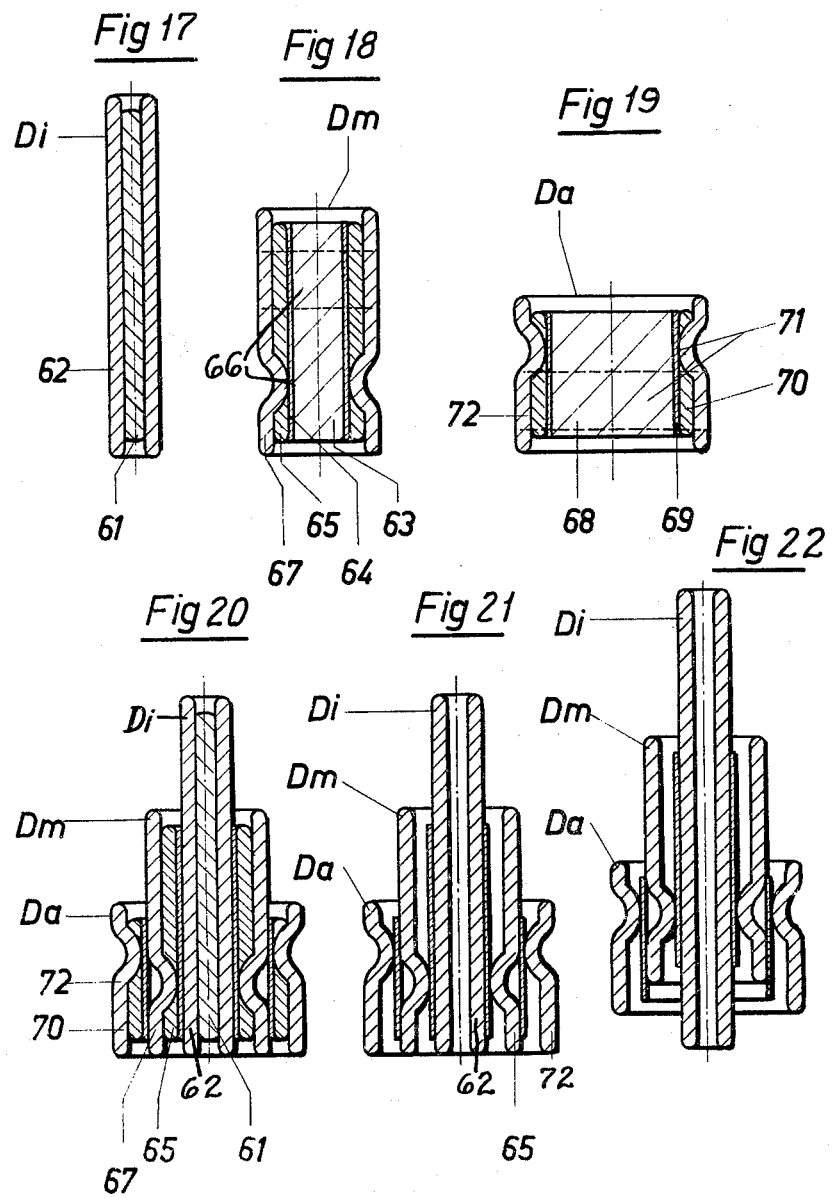

3,209,622
PROCESS FOR THE MANUFACTURE OF MUL-
TIPLE-HOLE SPINNING BODIES
Hans Joachim Dietzsch, Chemin de Esperance 10,
Lausanne, Switzerland, and Otto Dietzsch, Degerfeld,
Stein (Rhein), Switzerland
Original application Mar. 8, 1956, Ser. No. 570,401, now
Patent No. 3,075,241. Divided and this application
Jan. 21, 1963, Ser. No. 254,038
Claims priority, application Germany, Mar. 8, 1955,
T 10,664; Dec. 13, 1955, T 11,654
6 Claims. (Cl. 76—107)

This application is a division of application Serial No. 570,401, filed March 8, 1956, now Patent No. 3,075,241.

The present invention provides a multiple-hole spinning nozzle of highest dimensional precision notwithstanding small size, guaranteeing highly safe operation needing no interruption for long periods.

A primary object of this invention consists in a process for the manufacture of multi-hole spinning nozzle bodies having nozzle channels of a cross-section within the $\mu$-dimension.

In place of metal as structural material for the nozzle bodies, other inorganic or organic materials may be employed, such material having a different resistance characteristic with respect to a coherence when treated by mechanical, thermic or chemical operations.

In place of an electrolytic metalization, any other metalization method resulting in a dense layer may be used, for example, the so-called Schoop metal-spraying process, metal evaporation, particularly in high vacuum, metal depositions by thermic disintegration of non-stable metal alloys, such as hydrites, carbonyls, etc.

Obviously, the metallic parts of the new device, in particular of the nozzles, may be refined by a suitable metallurgical method or, subsequently, influenced in any manner with respect to their qualities.

The metal of low resistance can be removed from the narrow joining areas by any of the methods known in metal working. For example, a cutting tool, such as a turning tool, a rotating wire having grinding particles, or the like attached thereto, may be employed. The metal may be removed thermically, for example, by locally melting the metal or chemically, such as by local etching.

Since the high resistance material which is above the separation point is waste material, the nozzle can be made according to the invention in a more economic manner by covering, prior to the application of the second and each of the further high resistance metal layers, each preceding metal layer with an insulating layer. Each of these insulating layers started slightly closer to the nozzle tip, so that each of the succeeding metal layers of higher resistance will be correspondingly shorter in axial direction. Finally, the insulating layer is removed.

It is still another object of the invention to modify the manufacture of a multi-stage nozzle of alternating low and high resistance metal layers, particularly in case of nozzles of larger open cross section, by designing each nozzle stage as a separate structural unit made of a low resistance core of suitable diameter having radially staggered grooves on the surface and a tubular enclosure of high resistance material surrounding the core surface and then to centrally open up the unit by removing the core material so that the next nozzle stage can be inserted and fitted as precisely as possible. After the insertion of all of the nozzle stages, the multi-satge nozzle is built into a carrier body, and finally, the rest of the low resistance material is removed.

In order to limit the removal of the core material to the desired free cross section, a core of an interior, specifically low resistance core, for example, a suitable dimensioned silver wire, having an outer layer corresponding to the desired depth of the grooves, is selected, said outer layer being made of a material having different resistance properties. For example, an electrolytically applied nickel layer may be used which will be removed in the zone of the grooves. In order to limit the removal of the material to the outer layer, a separation foil of suitable resistance properties, for example, of hard chromium, is provided between the inner and the outer core layers. From the core structure described in the foregoing the silver may be removed, for example, by anodic electrolysis in an alkaline cyanide bath against which nickel is stable. The separation foil is not disturbing to nozzle operation, due to its extreme thinness and, therefore, may remain within the finished multi-nozzle.

These and other objects and advantageous features of this invention will be apparent from the following detailed description and drawings, appended thereto, wherein merely for the purpose of disclosure non-limitative embodiments of the invention are set forth.

In the drawings:

FIG. 1 is a longitudinal section through a three-stage nozzle body produced according to the invention;

FIG. 2 is a cross section through the nozzle body taken on the line 2—2 of FIG. 1 in the direction of the arrows;

FIG. 3 is a cross section through the nozzle body taken on the line 3—3 of FIG. 1 in the direction of the arrows;

FIGS. 4 to 14 are longitudinal sections through an embodiment of a three-stage nozzle body similar to that of FIG. 1 showing different manufacturing stages;

FIG. 15 is a cross section taken on line 15—15 of FIG. 7 in the direction of the arrows;

FIG. 16 is a cross section taken on line 16—16 of FIG. 8; and

FIGS. 17 to 22 are longitudinal sections through a modified embodiment of a three-stage nozzle body at different manufacturing stages.

First, the manufacture of a multi-stage body which is of particular importance for practicing the invention will be described in the following.

A section through an embodiment of such three-stage nozzle body, produced according to the invention, is schematically shown in FIGS. 1, 2 and 3 and which is made of hard gold. The inner nozzle tube D$i$ has the greatest and is surrounded by a slightly shorter intermediate nozzle tube D$m$ which, as shown in FIG. 2, is integrally joined to the inner nozzle tube D$i$, at least at one level. The intermediate tubular nozzle D$m$ is surrounded by an outer ring nozzle D$a$ which, in turn, is shorter than the intermediate nozzle tube D$m$ and is joined integrally therewith, as shown in FIG. 3, at least one level. In the embodiment illustrated in FIG. 2, the intermediate nozzle D$m$ and the inner nozzle D$i$ are connected with one another at two places which are radially displaced 90° with respect to the joint shown in FIG. 2. The free opening of the nozzles depends on the desired cross section of the spinning product. Useful textile fibers are made, for example, by means of nozzles in which the inner nozzle has an opening of 10$\mu$, a material diameter of 10$\mu$, and the two outer nozzles each have an annular width of 20$\mu$ and also a material diameter of 20$\mu$.

By the $\mu$-dimension shall be understood dimensions measured in entities of $\frac{1}{1000}$ mm.

A method for manufacturing such three-stage nozzle bodies will be described with reference to FIGS. 4 to 14, whereby the layers are exclusively applied electrolytically. Consequently, in this case, only metallic material can be used.

Copper or silver are used as auxiliary material which is removed during the manufacture of the nozzle, while hard gold or gold alloys (750 parts of Au and 250 parts of Ag) are employed as structural material for the nozzle body.

In place of hard gold, rhodium or hard chromium have been used successfully. According to FIG. 5, a hard gold layer 11 with a thickness of $10\mu$ is electrolytically applied to a copper or silver wire 10, FIG. 4, having a diameter of $10\mu$. The hard gold layer is covered by an electrolytically applied copper or silver layer 12, FIG. 6, having a thickness of $20\mu$. The soft metal layer 12 which was applied in the last step and also some parts of the hard metal layer 11 underneath the layer 12 are now removed to form segments by cutting tools, such as grinding wheels, milling tools, drills, etc. at certain zones in dependence on the longitudinal dimension of the final nozzle body. As a result thereof, a round notch or a notch having corners is produced as shown in FIGS. 7, 8, 15 and 16. Thus, the hard metal layer 11 is exposed at the present points 13. A further annular layer 14, FIG. 9, of hard metal having a thickness of about $20\mu$ is galvanically applied, said layer integrally joining with the inner hard metal layer 11 at the recessed points 13. Therefore, the intermediate product according to FIG. 9 has at the recessed points a cross section which is shown in FIG. 2.

In the next step, the upper part of the incomplete nozzle product obtained, as shown in FIG. 10, is provided with a non-metallic layer 15 below the joint of the hard metal layers, said layer 15 being stable against the electrolyzing liquid and may consist of a lacquer. A soft metal layer 16 of an annular thickness of $20\mu$ is then electrolytically applied to the part of the hard metal layer 14 which was left free, FIG. 11, and this layer is removed in the form of segments at a zone at the level 17, FIG. 12, determined by the desired length of the outer nozzle. Such operation has been described with respect to the recess 13 with reference to FIGS. 7, 15, 8 and 16.

Thereafter, the last or outer annular nozzle layer 18, FIG. 13, is applied to a thickness of about $20\mu$.

The nozzle body with all its layers obtained by electrolytic steps is shown complete in FIG. 14. The nozzle body is cut by means of a precision lathe with the aid of a micrometically adjustable cutting tool, for example, a lathe tool or a turning diamond, at the points 19 and 20, until a certain depth is obtained. The cutting depth at 19 is dimensioned in such a manner that the lacquer layer 15 and the hard metal layer 14 are completely cut, while the innermost hard metal layer 11 is not penetrated. This step can be carried out without any difficulties since the soft metal layer 12 is located between the hard metal layers 14 and 11.

At the cutting point 20, only the outermost hard metal layer 18 is cut, while the two other hard metal layers 14 and 11 remain uncut. Also here, the soft metal layer 16, between the hard metal layers 18 and 14, serves as a safety zone for the cutting tool.

Subsequently, the nozzle body is machined to the proper size for assemblying by cutting, sawing, or turning at 21 and 22, and is then chemically treated to dissolve the protective layer 15 and all of the soft metal material, that is, the layers 10, 12 and 16 are dissolved. A boiling 65% nitric acid solution has proven suitable for this purpose. By means of the vapor developed in the boiling solvent and, if necessary, by application of a vacuum, care is exercised that fresh solvent enters the nozzle chambers continuously, said chambers becoming gradually deeper and deeper during the dissolving operation.

Thus, the nozzle body, comprising the three nozzle tubes D$i$, D$m$, and D$a$ ready to be applied, is produced as shown in FIG. 1.

A modified method for manufacturing a three-stage nozzle is illustrated in FIGS. 17 to 21, inclusive, and 22. As indicated in the foregoing, the principle of this method of manufacture is in that the individual nozzle stage bodies are made separately from one another and are combined to a spinning nozzle assemblage when built in.

The innermost nozzle body D$i$ comprises a core 61 of nickel wire of, for example, $10\mu$ diameter, and a tubular sleeve 62 of hard metal of about $10\mu$ thickness. The intermediate nozzle body D$m$, FIG. 18, comprises a core member 63 of silver wire, the thickness of which corresponds practically to the outer diameter of the inner nozzle body 61 and 62, that is to $30\mu$. The silver wire 63 is first covered with a hard chromium layer 64 of about $1\mu$ and, thereafter, with a nickel film 65, of, for example, $20\mu$. In the same way as in the embodiment of FIG. 7, the nickel layer will be provided with notches 66 extending to the separating layer 64. The actual intermediate nozzle tube 67, comprising a rare metal layer of about $20\mu$ is applied to the joined core 63, 64 and 65. Thus, the intermediate nozzle tube has an outer diameter of about $112\mu$. The outer nozzle body D$a$, FIG. 19, will be made in the same way as the intermediate nozzle body, that is of a silver wire core 68 of about $112\mu$ thickness, a separating hard chromium film 69 of about $1\mu$ thickness, a nickel layer of $20\mu$ thickness forming the outer core sleeve 70 and the actual nozzle tube 72 which retracts inwardly into the nickel layer 70 at the notches 71.

The nozzle bodies D$i$, D$a$ and D$m$ are first made in suitable lengths, that is, preferably cut from longer tubular pieces and their edges are rounded. The silver wire cores are then removed from the bodies D$m$ and D$a$, FIGS. 18 and 19, by anodic electrolysis in an alkaline cyanide bath, whereupon the nozzle bodies are placed within one another, as shown in FIG. 20. Such multi-stage nozzle members, consisting of solid material except for the small notches at 66 and 71, are then inserted into a spinning nozzle body, and, subsequently, the nickel layers 61, 65 and 70 are removed therefrom by 65% nitric acid. The raw nozzle members have then the form shown in FIG. 21, in which the spinning nozzle body is omitted, whereby the lower front surfaces of the three nozzle tubes lie in a common plane. However, the individual nozzle tubes may be assembled in such a manner that they end at different levels, as shown in FIG. 22. This or a similar kind of nozzle arrangement may be practical in certain spinning methods.

It is also within the scope of the invention to omit the separating hard chromium layer, e.g. 64, 69 and to directly cover the silver wire core with the nickel film.

We claim:

1. A process for the manufacture of multi-hole spinning nozzle bodies having nozzle channels of a cross-section within the $\mu$-dimension comprising the steps of:
   (a) electrolytically applying to a wire carrier a first layer of a first metal which substantially remains when treated with a predetermined chemical substance;
   (b) electrolytically applying a layer of a second metal which is removable when treated with said predetermined chemical substance;
   (c) removing in axially and peripherally restricted zones parts of said second layer to form locally restricted openings in said second layer and superficial parts radially adjacent to said openings of said first metal layer to form locally restricted cavities in said first metal layer;
   (d) electrolytically applying a third layer of said first metal to said second layer and to said openings and said cavities to integrally connect said third and first layers; and
   (e) removing said second metal and said wire carrier by means of said predetermined chemical substance to provide a central nozzle channel and an annular nozzle channel.

2. A process according to claim 1, in which prior to applying said third layer to said second layer, said second layer is covered along an end portion of its axial length remote from the nozzle tip with an insulating layer preventing said end portion from being covered with said third layer.

3. A process for the manufacture of multi-hole spinning nozzles bodies consisting of a central tubular nozzle member provided with a central nozzle channel having a predetermined cross-section and at least one radially outer tubular member defining an annular nozzle channel having inner and outer walls, said channels having cross-sections within the $\mu$-dimension comprising the steps of:

(a) electrolytically applying a first layer of a first metal which substantially remains when treated with a predetermined chemical substance to a temporary core of a second metal which is removed when treated with said predetermined chemical substance and said core having a cross-section corresponding with that of the central nozzle channel and said first metal layer having an outer circumference corresponding with that of the inner wall of said annular nozzle channel, and thereafter removing said temporary core by means of said predetermined chemical substance to form said central tubular member;

(b) electrolytically applying on a second core of said first metal having an outer circumference corresponding with that of the inner wall of said annular nozzle channel a layer of said second metal having an outer circumference corresponding with that of the outer wall of said annular nozzle channel;

(b²) removing in axially and peripherally restricted zones parts of said second metal layer to form locally restricted openings in said second layer;

(b³) electrolytically applying a third layer of said first metal to said second metal layer and to fill said openings; and (b⁴) removing said second metal layer by means of said predetermined chemical substance and taking out said first metal core loosened by said chemical removal of said second layer to form an outer tubular member; and (c) coaxially assembling said central tubular member and said outer tubular member.

4. A process according to claim 3, in which the steps of electrolytically applying a layer of said second metal to a core consisting of said first metal, and locally removing parts of said second metal layer, and electrolytically applying a layer of said first metal are repeated to form additional tubular members.

5. A process according to claim 3, in which the metal of said temporary core is silver and said first layer metal is nickel.

6. A process according to claim 3, in which a thin intermediate layer of metal which is mechanically harder than the metal of said core is electrolytically inserted between said core and said first layer of said second metal.

References Cited by the Examiner
UNITED STATES PATENTS

| | | | |
|---|---|---|---|
| 1,063,417 | 6/13 | Cook | 204—9 |
| 1,646,602 | 10/27 | Smith | 29—157 |
| 1,844,108 | 2/32 | Smythe | 29—423 XR |
| 2,930,115 | 3/60 | Dietzsch et al. | 76—107 XR |

GRANVILLE Y. CUSTER, JR., *Primary Examiner.*